June 4, 1940.   F. FRANZ ET AL   2,203,409
APPARATUS FOR AND METHOD OF TREATING HAT BODIES
Filed Jan. 27, 1938   12 Sheets-Sheet 1

INVENTORS
Frederick Franz
Arthur H. Boesch
BY Robert Pash
Blair, Curtis, Dunne + Hayward
ATTORNEYS

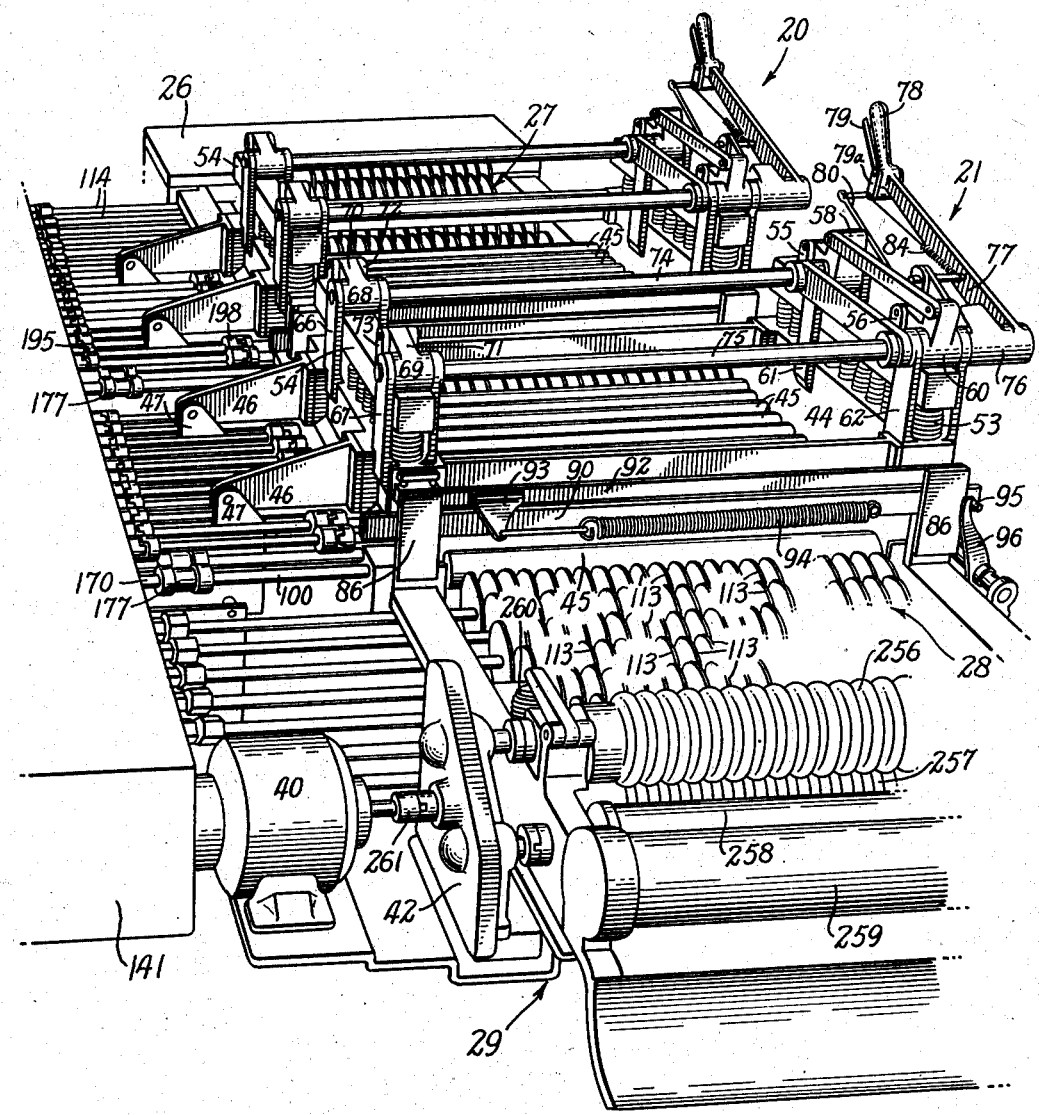

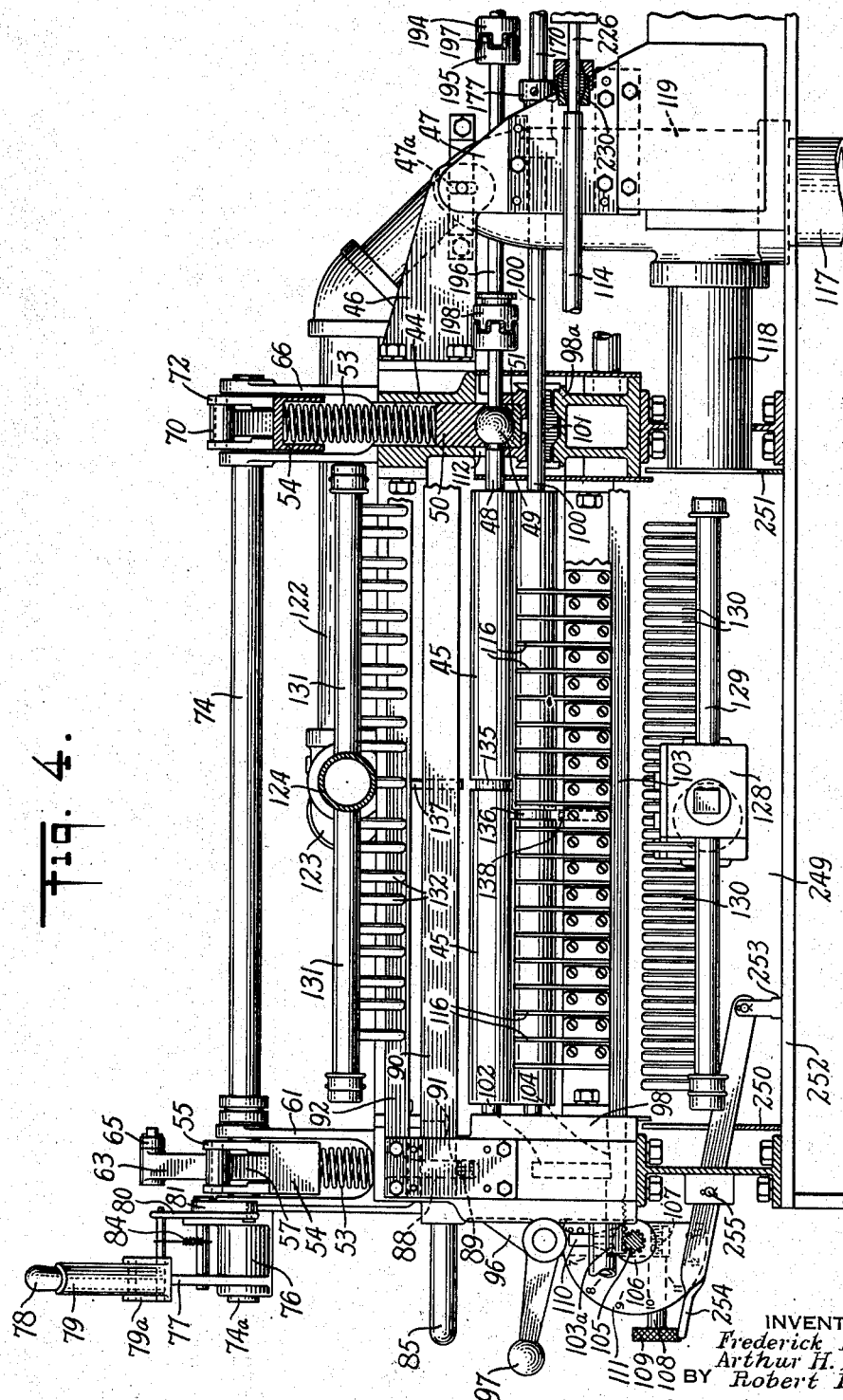

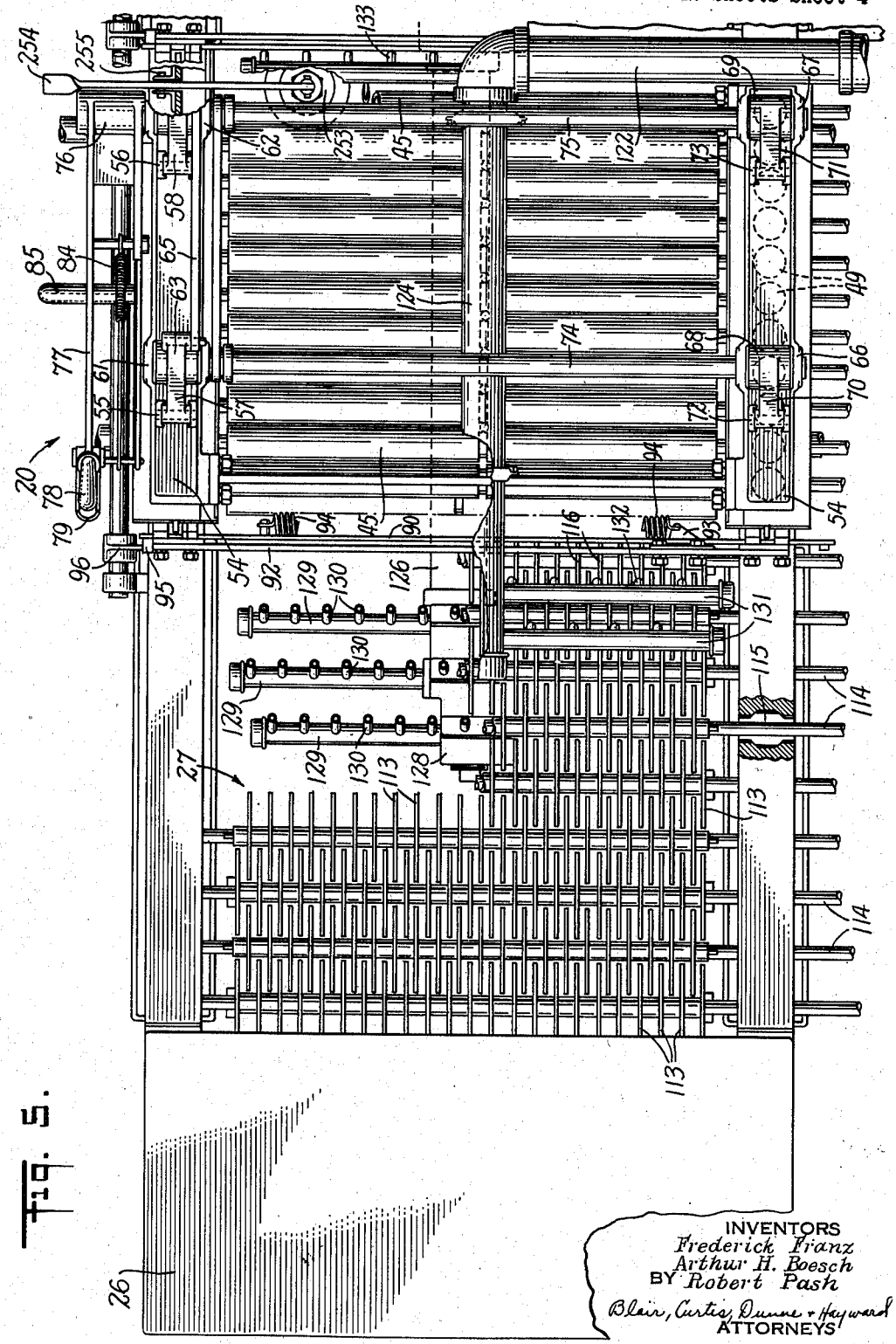

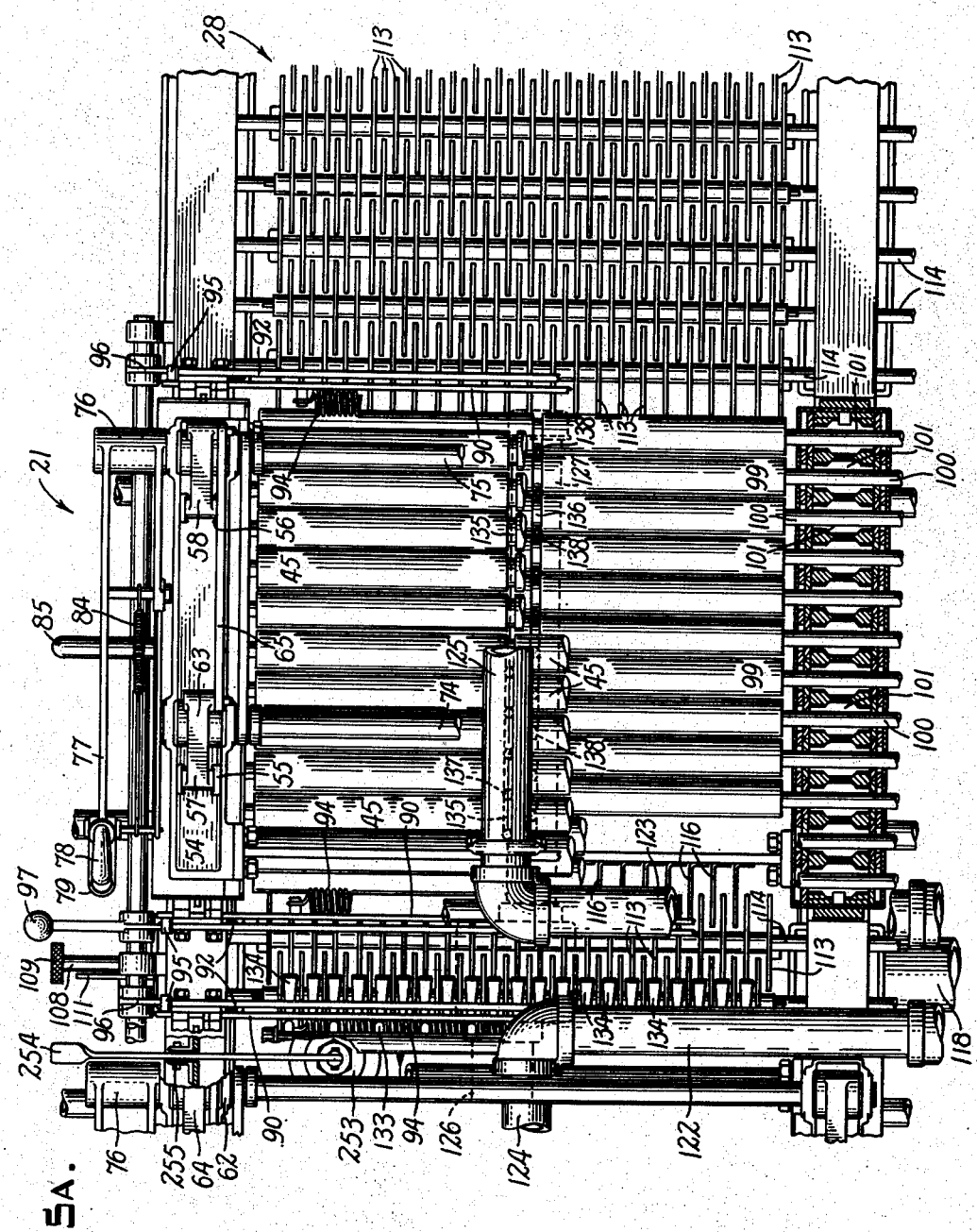

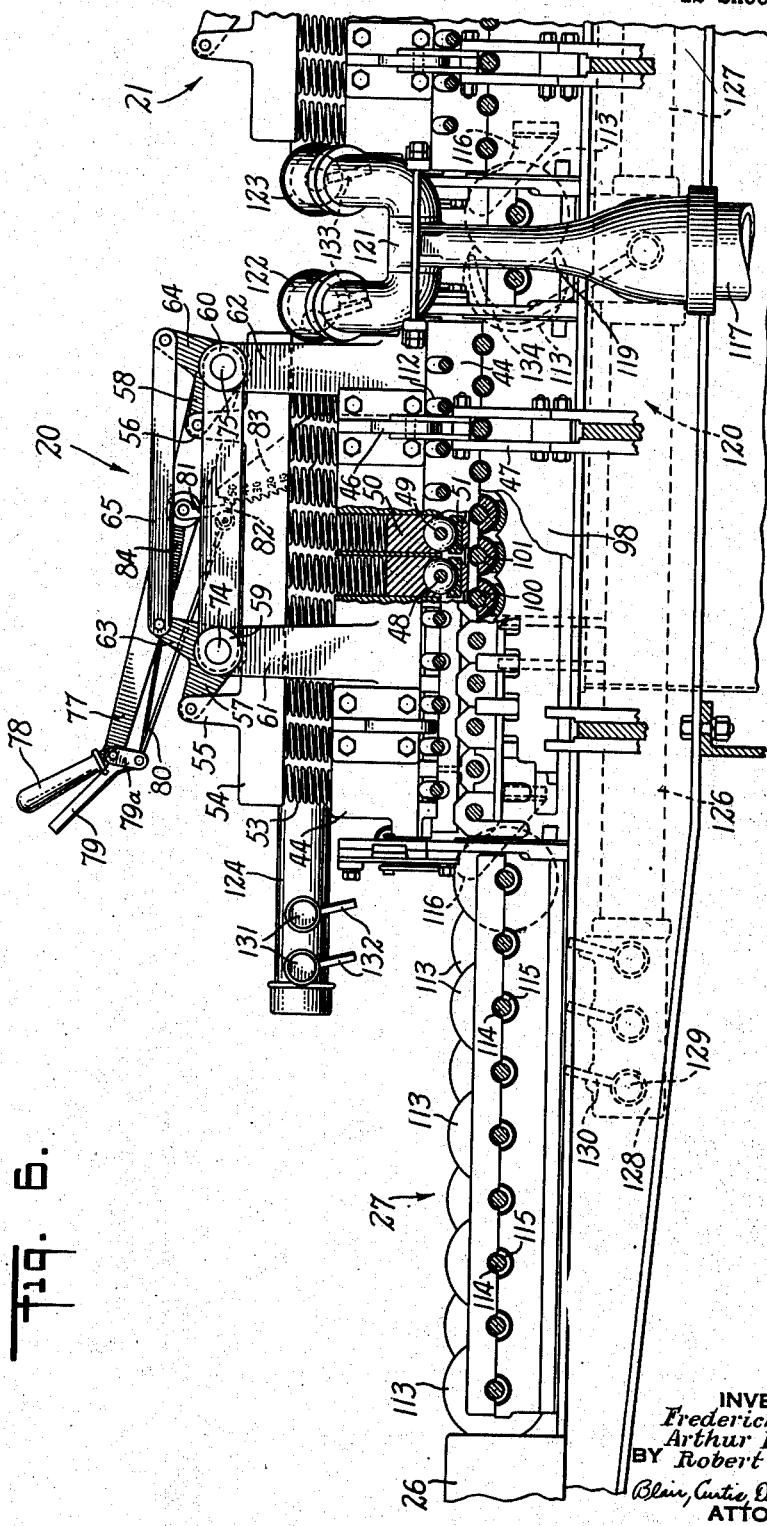

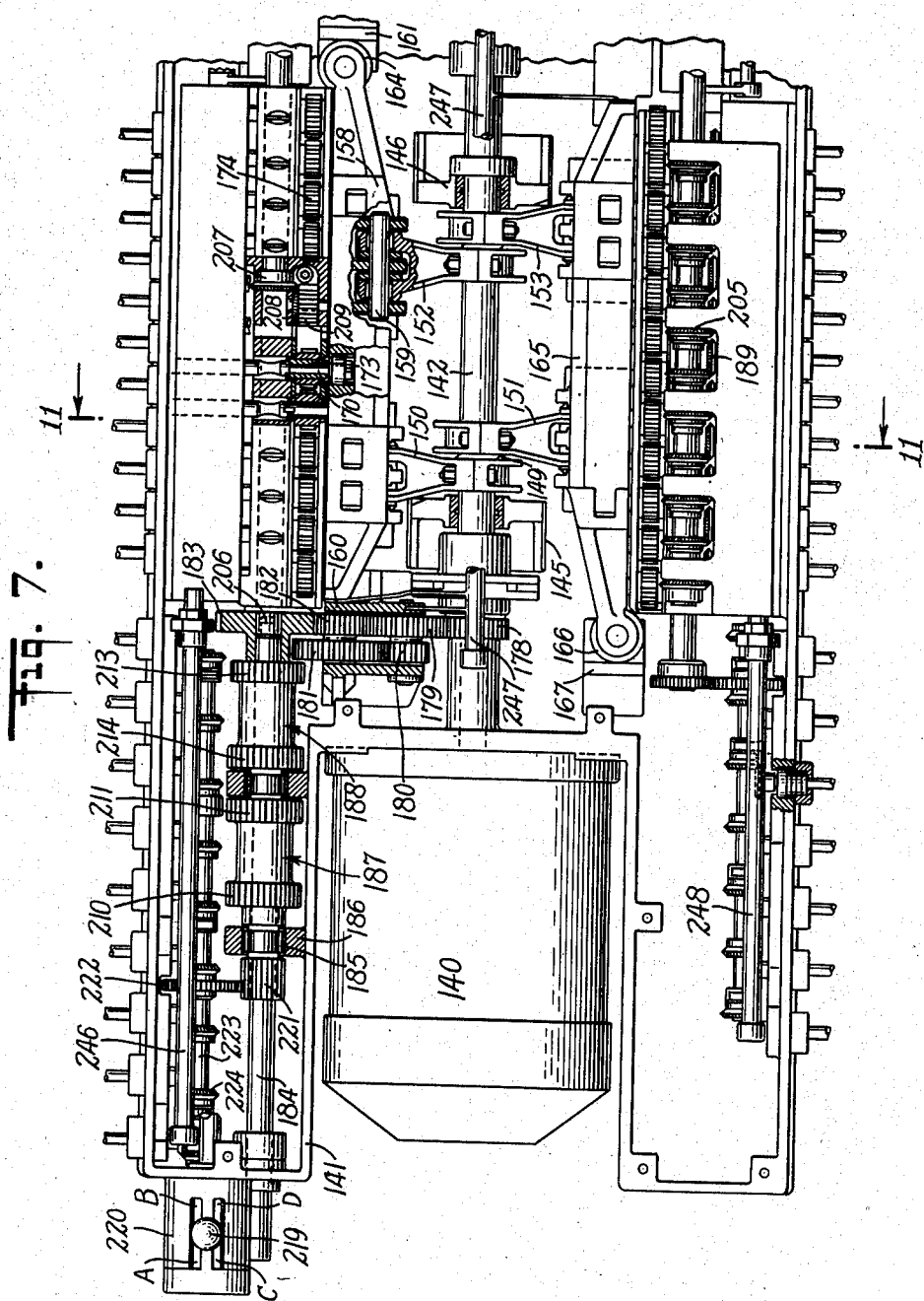

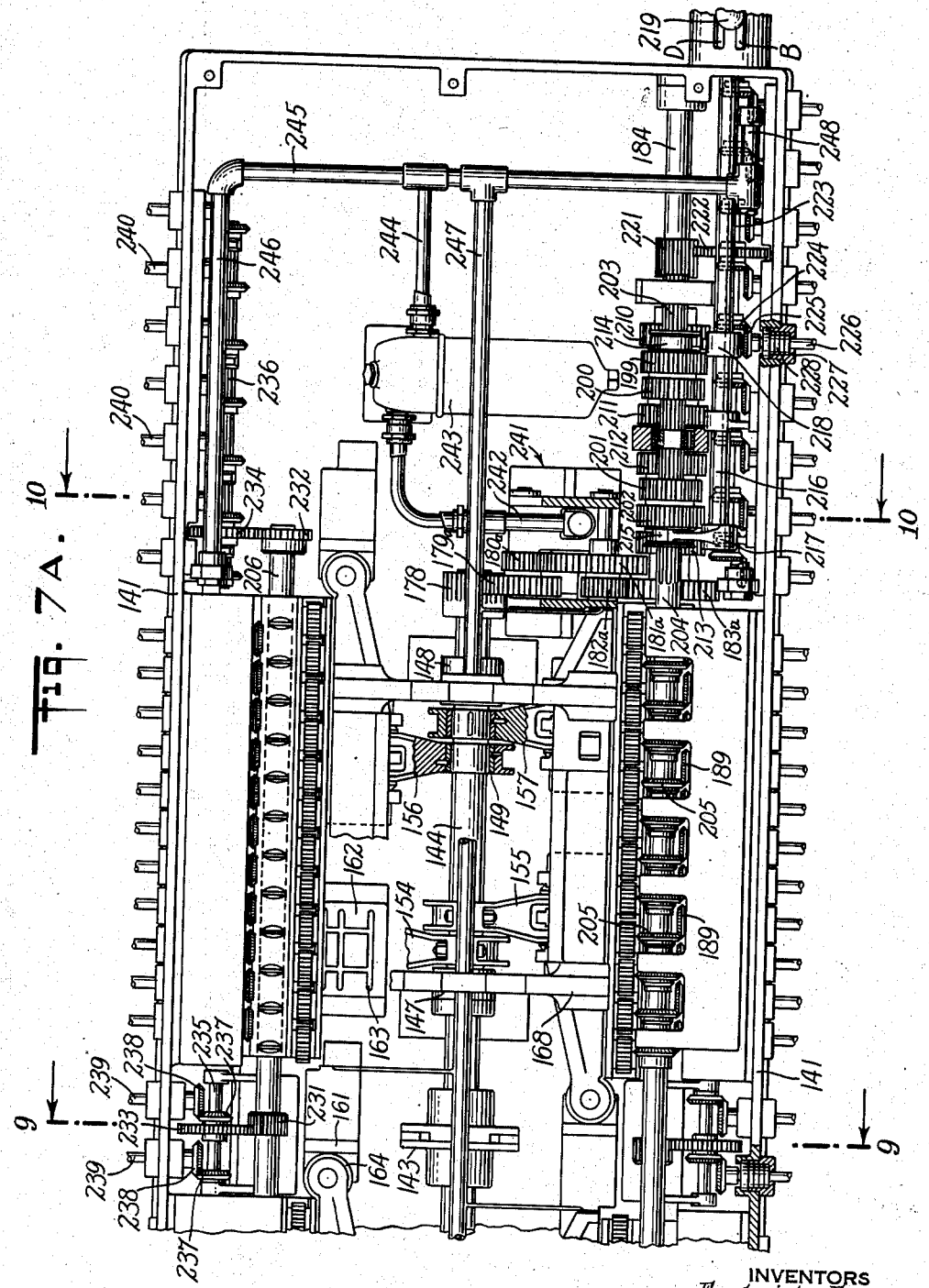

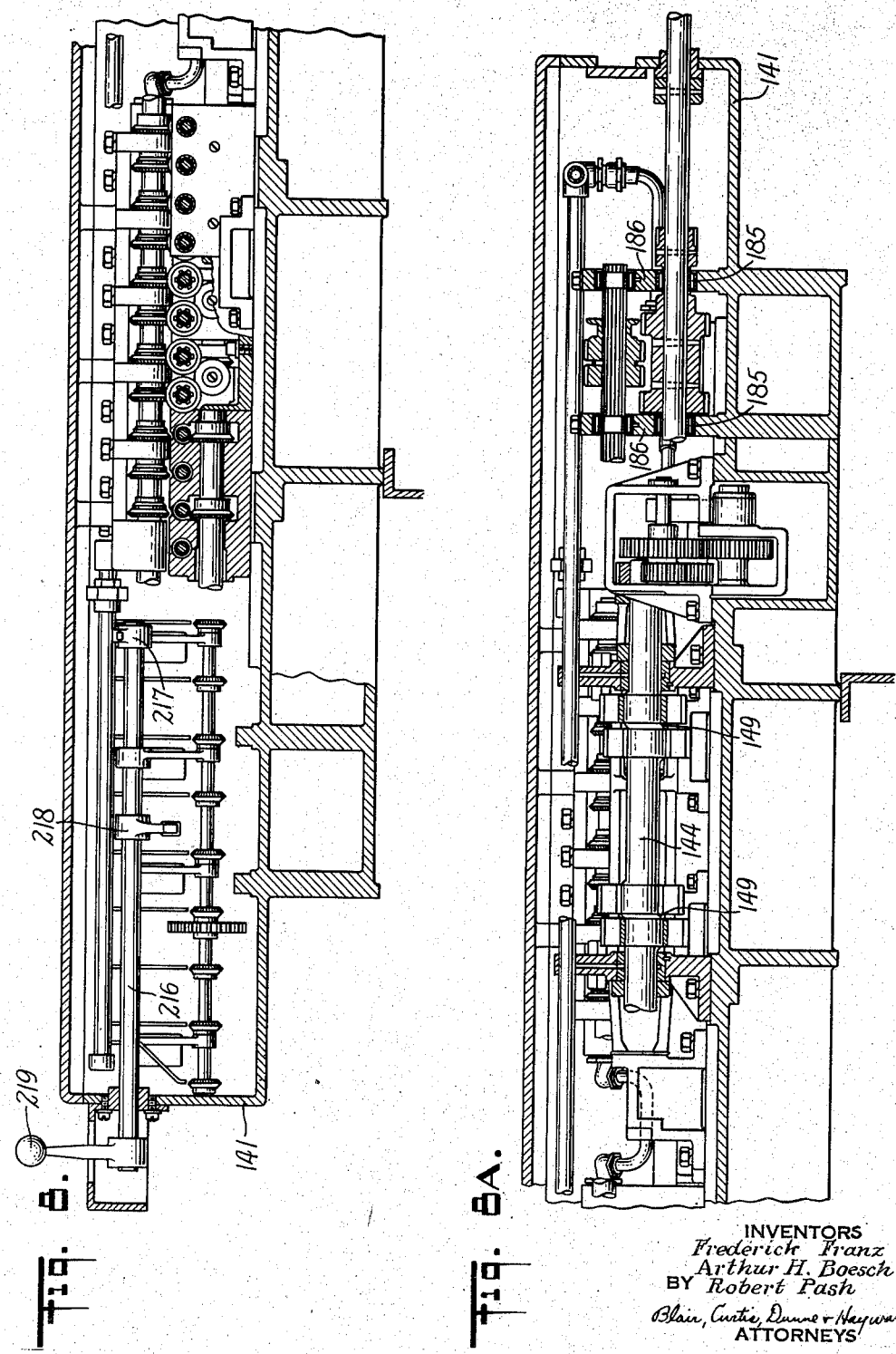

June 4, 1940.　　　F. FRANZ ET AL　　　2,203,409
APPARATUS FOR AND METHOD OF TREATING HAT BODIES
Filed Jan. 27, 1938　　　12 Sheets-Sheet 10
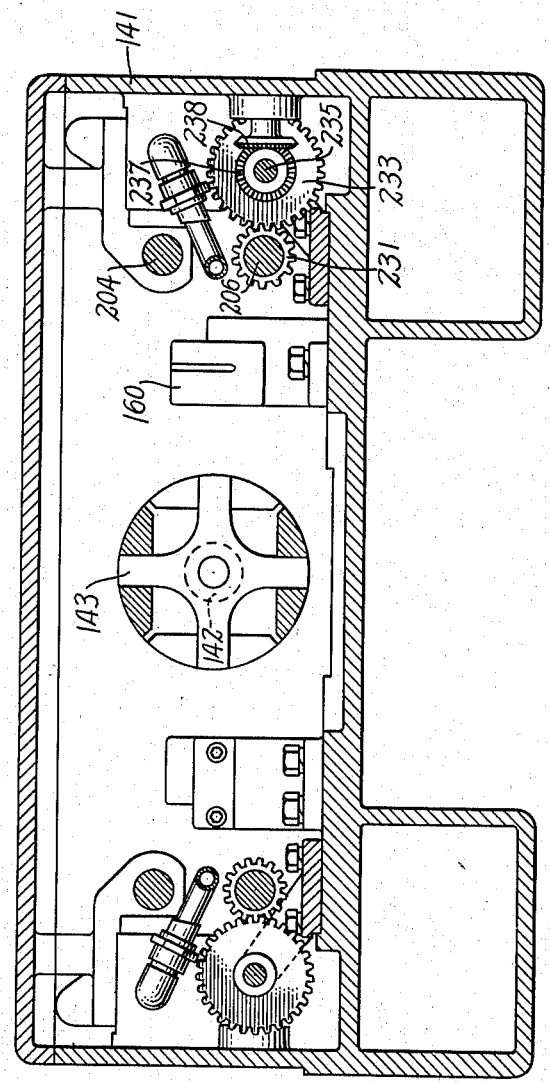
INVENTORS
Frederick Franz
Arthur H. Boesch
BY Robert Pash
Blair, Curtis, Dunne + Hayward
ATTORNEYS

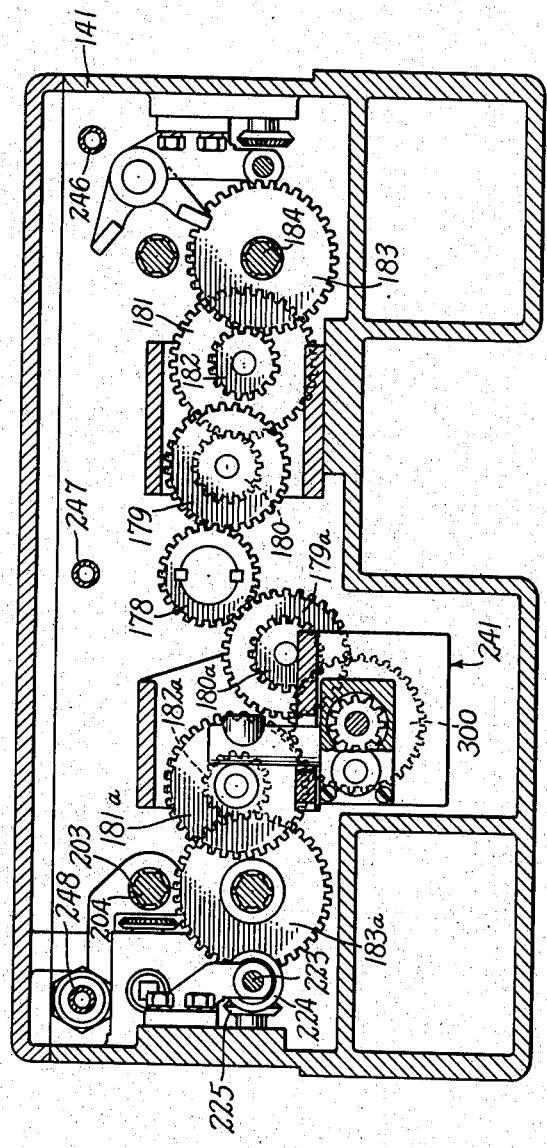

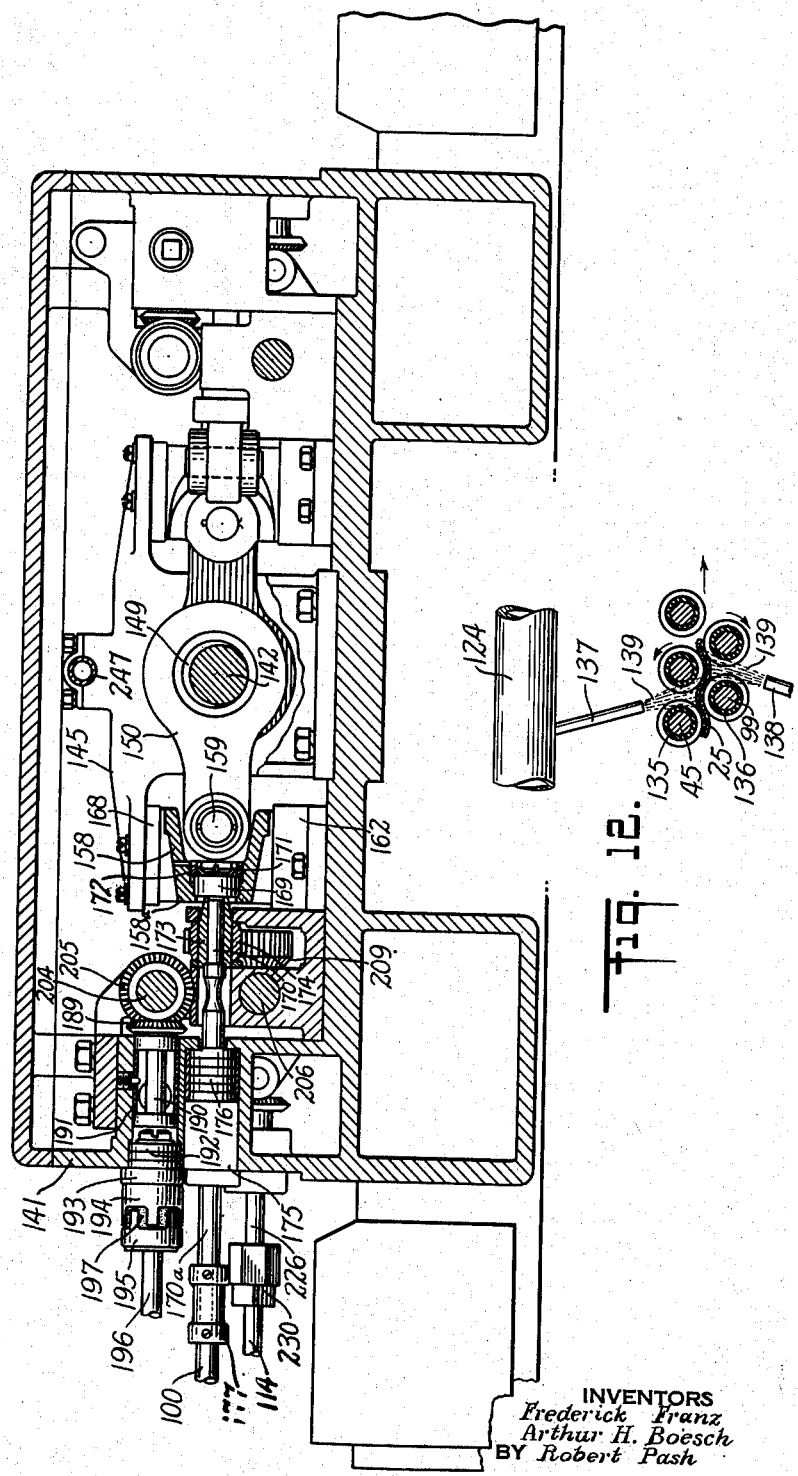

Patented June 4, 1940

2,203,409

UNITED STATES PATENT OFFICE 2,203,409

APPARATUS FOR AND METHOD OF TREATING HAT BODIES

Frederick Franz, New Haven, and Arthur H. Boesch, Danbury, Conn., and Robert Pash, Roselle, N. J.; said Franz and said Pash assignors to said Boesch Application January 27, 1938, Serial No. 187,138

33 Claims. (Cl. 28—5)

This invention relates to a method of and apparatus for treating hat bodies.

It is among the objects of this invention to provide high speed and high production apparatus capable of felting, shrinking and crozing hat bodies or bats. A further object is to provide a method by which bats can be uniformly treated in larger quantities per unit of time than has heretofore been possible. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

Figure 3 is a fragmentary perspective view of a felting compartment of the machine;

Figure 4 is a transverse sectional elevation between adjacent felting compartments of the machine;

Figure 5 is a fragmentary plan view of one felting compartment of the machine;

Figure 5A is a fragmentary plan view of a felting compartment of the machine adjacent and complementary to the felting compartment shown in Figure 5;

Figure 6 is a fragmentary longitudinal section of adjacent felting compartments of the machine;

Figure 7 is a fragmentary plan view, partly in section of a portion of the transmission or driving compartment of the machine;

Figure 7A is a fragmentary plan view, partly in section, of another portion of the transmission complementary to that portion shown in Figure 7;

Figure 8 is a longitudinal fragmentary elevation, partly in section, of one portion of the transmission;

Figure 8A is a longitudinal fragmentary elevation, partly in section, of another portion of the transmission complementary to that portion shown in Figure 8;

Figure 9 is a sectional elevation taken along the line 9—9 in Figure 7A;

Figure 10 is a transverse sectional elevation taken along the line 10—10 of Figure 7A;

Figure 11 is a transverse sectional elevation taken along the line 11—11 of Figure 7; and Figure 12 is a diagrammatic sectional elevation of upper and lower felting rolls.

Similar reference characters refer to similar parts throughout the several views of the drawings.

Figure 1:
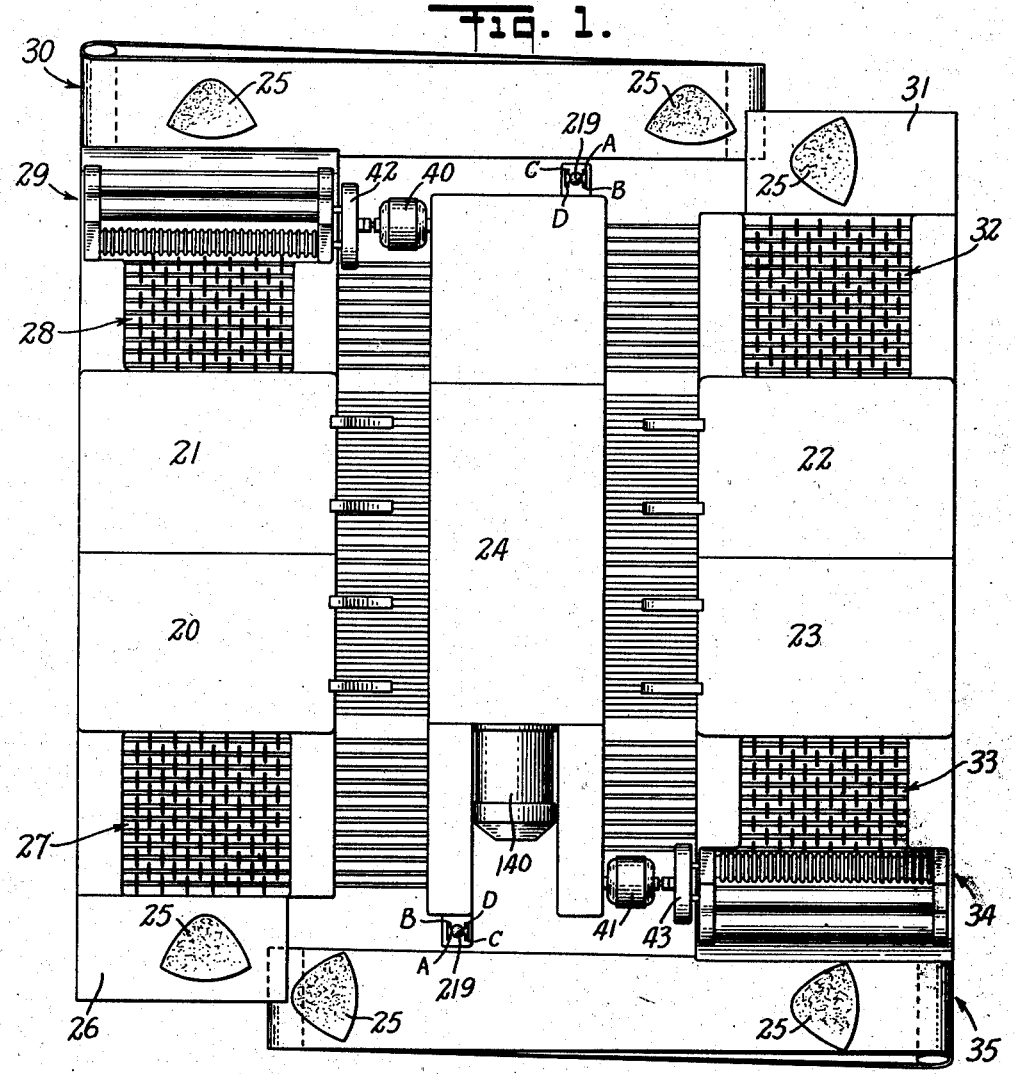
Figure 1 is a diagrammatic plan view of the machine.

Referring now to Figure 1, the machine generally comprises felting compartments generally indicated at 20, 21, 22, 23, in which is disposed mechanism capable of simultaneously felting, shrinking and crozing hat bodies, the mechanism of compartments 20 and 21 lying on one side of and being driven by driving mechanism housed in a driving compartment or transmission generally indicated at 24, the felting mechanism of felting compartments 22 and 23 also being driven from transmission 24, but lying on the opposite side thereof.

Each pair of compartments 20, 21 and 22, 23 have an entry and a delivery end. Thus a bat 25 is placed in the felting machine at entry end 26 of the left-hand compartments 20 and 21. Conveying mechanism generally indicated at 27 conveys bat 25 into felting compartments 20 and 21 wherein the bat is treated, and from which it is delivered by conveying mechanism 28 to stacking mechanism generally indicated at 29, which receives the successive bats from conveyor 28 and deposits them on an endless belt conveyor generally indicated at 30. Belt conveyor 30 carries the bats to the entry end 31 of felting compartments 22 and 23, where an operator places the bats on conveyor 32, which carries the bats into felting compartments 22 and 23 for treatment therein. A conveyor 33 takes the bats from felting compartment 23 and delivers them to another stacker 34, similar to stacker 29, which projects the bats onto another endless belt conveyor 35, which returns the bats to entry end 26 of felting compartments 20 and 21. Conveyors 30 and 35 are preferably at rest during the stacking period and are operated when it is desired to bring the stack of bats from the delivery to the entrance position.

This travel of bats 25 constitutes what is called one "pass" of the bats through the machine, and the number of passes is determined by the amount of treatment needed. In this connection, the position of bat 25 is usually changed after each pass through one pair of felting compartments. As shown in Figure 1, bat 25 at entry end 26 lies tip first, whereas at entry end 31 it lies edge first. Preferably the bat is passed through the machine four times, i. e., tip first, other side tip first, one edge first, other side opposite edge first, thus constituting four passes through the machine comprising what is termed a "round."

Figure 2:
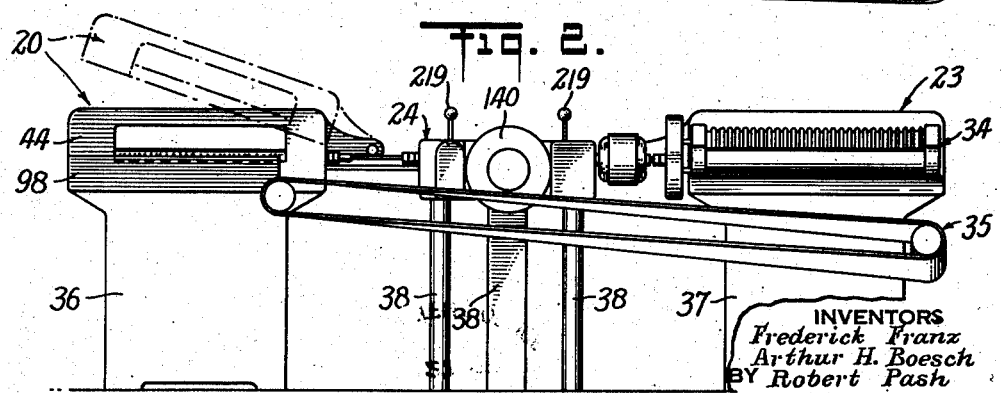
Figure 2 is a diagrammatic end elevation of the machine.

With reference to Figure 2, felting compartments 20, 21 and 22, 23 are respectively mounted on suitable standards 36 and 37 in the lower portions of which are disposed water tanks and piping, as will be described in greater detail below. Transmission 24 is also mounted on suitable standards 38, which also carry a motor 39, connected to the mechanism in transmission 24. Preferably stackers 29 and 34 (Figure 1) are individually driven by motors 40 and 41, respectively, through suitable reduction gears 42 and 43, respectively. For a detailed description of the construction and operation of stackers 29 and 34, reference is made to the copending application of Robert Pash, Serial No. 750,116, filed October 26, 1934.

The felting, shrinking and crozing, or sizing, as these operations will hereinafter be termed, may be accomplished by manipulation of the hat bodies soaked in clear or slightly acidulated hot water. In order to size the bats, as the hat bodies are termed, the individual fur fibers, which are barbed, must be worked together so that the barbs interengage and the fibers become interlaced to form a compact and strong felt. The rate at which the fur fibers can be interengaged is an index of the productive capacity of the method and apparatus utilized in sizing the bats. Accordingly, as the interengagement of the fur fibers can be expedited, the production of the machine is measured. To this end are directed the various steps and operations of our method and the various mechanisms which comprise our machine and which comprise one instrumentality by which our method may be practiced or directed.

*Felting compartment*

Figures 3, 4, 5, 5A and 6 are illustrative of felting compartments 20 and 21, for example, shown in Figure 1. With reference to Figure 3, it may be seen that felting compartments 20 and 21 are substantially similar in most respects. Accordingly, compartment 21 only will be considered. Compartment 21 includes a frame 44 in which a plurality of upper rolls 45 are rotatably mounted with their axes parallel and lying in the same horizontal plane. Frame 44 has secured thereto brackets 46 which are pivotally secured to vertical brackets 47, these brackets thus constituting the butt plates of a hinge which permit frame 44 and the mechanism carried thereby to be swung upwardly for a purpose to be described. As is more clearly shown in Figure 4, each of rolls 45, which preferably are formed of rubber disposed about preferably an iron core and whose diameters are on the order of 2", includes a shaft 48 whose opposite ends are journaled in frame 44. Shaft 48 has plain cylindrical bearings at one end and spherical balls 49 formed thereon or connected thereto at the other end, and these balls are journaled between bearing segments 50 and 51 which preferably are made of material which may be lubricated by water, for example, a phenolic condensation compound. Bearing segments 50 are slidably disposed in vertical bores 52 formed in frame 44, while bearing segments 51 are fixed therein, the segments and balls 49 being held in proper operative position by springs 53 whose upper ends are received in inverted box shaped housings 54.

With reference to Figure 6, spring housing 54 has upstanding arms 55 and 56, which are respectively pivotally connected to bell crank arms 57 and 58 of bell cranks 59 and 60. Bell cranks 59 and 60 are pivotally mounted respectively in U-shaped brackets 61 and 62 (see Figures 3 and 4) secured in any suitable manner to frame 44. Bell cranks 59 and 60 (Figure 6) also include arms 63 and 64, which are pivotally connected to a link 65.

With reference to Figures 3 and 4, the inner side of frame 44 also has a pair of U-shaped brackets 66 and 67 (Figure 3) which pivotally support levers 68 and 69 having arms 70 and 71 pivotally connected to lugs 72 and 73 secured to and extending from housing 54 (see also Figure 4). Bell crank 59 and lever 68 are secured to a shaft 74 (Figures 3, 4 and 6) journaled in brackets 61 and 66, bell crank 60 (Figure 3) and lever 69 being secured to a shaft 75 journaled in brackets 62 and 67. Thus bell cranks 59 and 60, and levers 68 and 69 all move together by virtue of their mounting on shafts 74 and 75 and the connection of the bell cranks by link 65.

Shaft 75 (Figure 4) has an extended end 74a to which the hub 76 of a lever 77 is secured. Lever 77 is provided with a hand grip 78 (Figure 6) near which a release finger 79 is pivotally secured to the lever. Release finger 79 has an extended end 79a to which a rod 80 is attached, the other end of this rod being pivotally secured to one end of a lever 81, whose other end is pivotally secured to lever 77. Lever 81 is provided with a pawl 82 which coacts with the teeth of a ratchet 83 secured to frame 44 to prevent upward movement of lever 77. A spring 84, anchored to lever 77 and secured to end 79a of release finger 79, urges pawl 82 into engagement with ratchet 83.

Thus the pressure exerted by springs 53 (Figure 4) may be varied at will by manipulation of lever 77. When lever 77 is depressed, bell cranks 59 and 60 pivot counterclockwise (Figure 6) to depress spring housing 54, thus compressing springs 53 to increase the pressure on bearing segments 50, and accordingly on cylindrical shaft and balls 49, thus increasing the downward pressure of upper rolls 45 (Figure 4) for a purpose to be described. Pawl 81 and ratchet 83 maintain the adjusted spring pressure which may be released by manipulation of release finger 79.

As noted above, frame 44 is hingedly related to the lower part of the machine, and as viewed in Figure 4, the frame is provided with a hand grip 85 by which the upper rolls and upper frame, and all the mechanism carried thereby may be swung counterclockwise about the pivotal axis of hinge brackets 46 and 47. It is important, however, that upper frame 44 be locked in place during the operation of the machine. To this end, the machine is provided with a lower frame 98 (see Figures 2 and 4) on each corner of which is secured a bracket 86 (Figure 3) provided with a slot 88 (Figure 4) which receives one of pins 89 which are secured to the corners of upper frame 44. Each pair of brackets 86 (Figure 3) embrace a slidable bar 90 having inclined surfaces or wedges 91 (Figure 4) adapted to ride over and bear on pins 89 to hold frame 44 and upper rolls 45 in proper operative position. Brackets 86 also support a bar 92 (Figure 3) which carries a plate 93. A spring 94 has one end secured to plate 93 and the other secured to slidable bar 90, thus urging the bar to the left, as viewed in Figure 3, and to the right as viewed in Figure 4, to force wedges 91 against pins 89 and thus hold upper frame 44 in position. Bar 90 (Figure 3) also carries at its right hand end a pin 95 against which a lever 96 may be forced by manipulation of handle 97 (Figure 4). Thus downward pressure of handle 97 causes lever 96 (Figure 3) to swing clockwise against pin 95, forcing bar 90 to the right to cause wedges 91 (Figure 4) to release pins 89. When so released, frame 44 may be lifted bodily by handle 85 and swung upwardly and away from lower frame 98.

Lower frame 98 (Figure 4) journals a plurality of lower rolls 99 similar in character to upper rolls 45, and arranged in staggered relation thereto (see Figure 6). Roll 99 are mounted on shafts 100 (Figure 4) whose opposite ends are rotatably borne by bearings 101 preferably formed of a material such as phenolic condensation compound, which can be lubricated by water. Bearings 101 preferably do not completely surround shaft 100 (see Figure 5A) and are suitably supported by portions 98a of lower frame 98. Thus bearings 50, 51 and 101 (Figure 4) effectively journal the upper and lower roll shafts 48 and 100.

As noted above, half-bearing 50 is vertically movable, and accordingly upper rolls 45 (Figure 4) also may move up and down. This movement occurs when a bat passes between the staggered rolls 45 and 99. When the bat passes under rolls 45, pressure is exerted against bearings 50 and 101, but not against bearing 51. Hence only bearings 50 and 101 wear under these conditions. When the machine is idling, i. e., when no bats are passing therethrough, the only bearing wear that occurs is on bearings 51. This wear approximates the wear on bearings 101. As bearing 50 continues to wear, it merely feeds downwardly in bore 52. Thus the distance between the axes of rolls 45 and 99 remains constant and the space between the rolls does not vary.

Because rolls 45 and 99 are arranged in staggered relationship, a bat passing therebetween follows an undulating path as it travels between the banks of upper and lower rolls. Depending upon the thickness of the bat being operated on, the spacing between adjacent upper and lower rolls is preferably adjusted. To this end, lower frame 98 (Figure 4) is provided at each corner with a suitable vertically movable pin 102, whose upper end bears against a corner of upper frame 44. Frame 98 also slidably mounts a horizontal bar 103 at each transverse edge, and each bar is preferably provided with a pair of inclined surfaces 104, against which the bottoms of pins 102 bear. One end 103a of rod 103 is toothed and meshes with a spur 105 mounted on one end of a shaft whose other end carries a similar spur meshing with teeth on the counterpart of rod 103. The shaft which carries spur 105 also carries a pointer 110 which registers on a dial 111 as the parts move. Thus, rotation of pointer 110 causes rotation of spur 105, which in turn effects linear movement of rod 103. As rod 103 and its counterpart move to the left, as viewed in Figure 4, pins 102 ride up on inclined surfaces 104, thus elevating upper frame 44 to the desired position. Accordingly, the upper bank of rolls 45 may be spaced from the lower bank of rolls 99 as desired, and the spacing is indicated on dial 111. The pressure with which the upper rolls bear against a bat passing through the machine may be varied at will by the positioning of lever 77 which controls the pressure of springs 53. The pressure is indicated by the numeral at the ratchet tooth on which the pawl 81 is placed.

Felting compartment 20 (Figure 1) has been described hereinabove and it will be understood that the other felting compartments 21, 22 and 23 are substantially identical in construction and operation, each compartment thus including upper and lower banks of rolls, the position of the upper banks being variable with respect to the lower banks, and the pressure with which the rolls in each upper bank bear on bats passing through the machine being variable as desired. It might also be well to note, with reference to Figures 4 and 6, that the ends of shafts 48 of upper rolls 45 extend through elongated slots 112, which accommodate the rise and fall of these rolls as bats pass thereunder, hinge bracket 47 also having a slot 47a for the hinge pintle to allow vertical movement of the upper rolls.

As previously noted, each felting compartment has conveying mechanism associated therewith. For example, felting compartment 20 is operatively positioned with respect to conveying apparatus 27, which delivers bats into the felting compartment. As shown in Figure 6, this conveying apparatus comprises a plurality of thin circular discs 113, secured in spaced relationship to shafts 114 (Figure 5) journaled at each end in water lubricated bearings 115 (Figure 5) which may be substantially similar to water lubricated bearings 101 (Figure 4). With reference to Figure 5, adjacent sets of discs 113 are inter-related so that the peripheries of the discs on one shaft almost abut the adjacent shaft. Sufficient sets of discs are preferably used to provide ample supporting surface for conveying the bats into the machine. Furthermore, the discs are preferably close enough together as to prevent the bat sagging between adjacent discs on the same shaft, or adjacent discs on adjacent shafts. Thus, upon rotation of the discs, the bat is carried up to the felting compartment. To facilitate the entry of the bats between rolls 45 and 99 (Figure 4) there is preferably provided a plurality of fingers 116, suitably secured to lower frame 98. The spacing between these fingers preferably equals the spacing between discs 113, each finger being disposed between adjacent discs at the entry end of the felting compartment (see Figures 5 and 6).

A similar arrangement of discs 113 and fingers 116 is disposed between adjacent felting compartments, such as compartments 20 and 21 (Figures 5 and 5A), these discs and fingers acting to receive the bats from compartment 20 and deliver them into compartment 21. Likewise, compartment 21 has associated therewith conveying mechanism 28 comprised of discs 113, as hereinbefore described, and these discs receive the bats from compartment 21 and deliver them to stacker 29, as viewed in Figure 3. It may now be seen that conveyors 32 and 33 (Figure 1) associated with felting compartments 22 and 23 respectively, are substantially similar to conveyors 27 and 28 and operate in a similar manner.

It is important that before and during the sizing of the bats they be well soaked with hot water. To this end, and with reference to Figure 4, a water pipe 117, connected to suitable hot water tanks in bases 36 and 37 (Figure 2) is provided for each pair of compartments 20, 21 and 22, 23. As the water supply for each pair of felting compartments is the same, only that for compartments 20 and 21 will be considered. Water pipe 117 is connected to a lower branch pipe 118 and an upper branch pipe 119. Lower branch pipe 118 is connected to a lower header generally indicated at 120 (Figure 6) and upper branch pipe 119 is connected by a hinged union 121 to a pair of distributing pipes 122 and 123, which in turn are connected to upper headers 124 and 125, and which extend respectively over the rolls in felting compartments 20 and 21 (see Figure 5). Lower header 120 comprises a section 126 which extends under the rolls in felting compartment 20 and a section 127 which extends under the rolls of felting compartment 21. Lower header section 126 has a distributor chamber 128 (Figures 4, 5 and 6) to the opposite sides of which a suitable number of spray pipes 129 are connected to extend laterally therefrom under that portion of conveyor 27 (Figure 5) adjacent the entry end of felting compartment 20. Spray pipes 129 are fitted with a suitable number of inclined nozzles or jets 130, which extend upwardly from spray pipes 129 between adjacent discs 113. Thus, hot water forced through lower header section 126 is shot upwardly through jets 130 against the bottom of a bat passing over conveyor 27 into felting compartment 20.

It is also desirable to soak thoroughly the top of the bats before they enter the felting compartment. Accordingly, upper header 124 (Figure 6) has a plurality of spray pipes 131 connected thereto, and extending laterally therefrom over portions of conveyor 27 adjacent the entry end of felting compartment 20. Spray pipes 131 are also provided with nozzles or jets 132 which slant downwardly and toward felting compartment 20 to direct a spray of hot water against the tops of bats entering the felting compartment.

It may now be seen that upper and lower jets 130 and 132 extend over those conveyor discs 113 which are immediately adjacent the entry end of felting compartment 20 (Figure 6). Thus a bat conveyed into the felting compartment is thoroughly soaked before it enters between the felting rolls. During the passage of the bat through felting compartment 20, rolls 45 and 99 (Figure 4) operate on the bat in a manner to be described, and in so doing, squeeze some of the water out of the bat. Accordingly, before the bat enters felting compartment 21 (Figure 6) it is important that it again be thoroughly soaked. To this end is provided upper intermediate jets 133 (see also Figure 5) connected to pipes 122 and 123 (Figure 6) in any suitable manner, and lower jets 134 (see also Figure 5) suitably connected to pipe 119. Thus, as the bat passes between compartments 20 and 21, it is again thoroughly soaked before its entrance into compartment 21.

As the bats travel through the felting compartments, they follow an undulating path as they are bent back and forth by upper and lower rolls 45 and 99. The undulations of this path are comparatively abrupt, the wave length being on the order of between two and three inches, by reason of the small diameter of the rolls. Furthermore, as will hereinafter appear, the rolls are rotating at a substantially high number of revolutions per minute. As may be seen in Figures 5 and 5A, adjacent upper rolls 45 are spaced a suitable distance apart, lower rolls 99 being similarly spaced to avoid any possibility of contact between the rotating rolls which would impair their operative surfaces. These factors of wave length, roll speed, roll spacing and roll pressure result in a substantial squeezing of water out of the bats. As the bats should be quite wet to facilitate and expedite sizing, rolls 45 and 99 (Figures 5 and 5A) are provided with slots 135 and 136, respectively, which are preferably spaced or offset from one another laterally. Each of upper headers 124 and 125 is provided with jets 137, one of which registers with each of upper slots 135, these jets being inclined in the direction of travel of the bats (see Figure 12). Lower pipe sections 126 and 127 (Figure 6) are also provided with upwardly extending jets 138 (Figure 5A) which are also preferably inclined in the direction of travel of the bat (see Figure 12) and which register with slots 136 in lower rolls 99. Jets 137 and 138 are positioned to direct streams of fluid 139 under pressure between adjacent upper rolls and adjacent lower rolls. Fluid streams 139 accordingly impinge directly on the traveling bat, the upper streams forcing the leading edge of the bat downwardly against lower rolls 99, and the lower streams forcing the leading edge of the bat upwardly against upper rolls 45. As the force of fluid streams 139 is exerted between adjacent rolls, the roll surfaces are not damaged and the leading edge of the bat, e. g. when the bat is traveling tip, is held in its proper course. The bat is thus kept well soaked while it is being treated.

It will now appear, with reference to Figures 1, 5 and 5A, that bats 25 thrown on the entry end of conveyor 27 are carried thereby to a point adjacent felting compartment 20. At this point the bats are thoroughly soaked by upper and lower jets 132 and 130 before the bats enter the felting compartment. Thence the bats travel into felting compartment 20 and are fed between the upper and lower roll banks, which cause the bats to follow an undulating path, i. e., the bats are bent back and forth rapidly as they pass between the rolls, and this bending results in inter-engagement of the fur fibers and shrinking of the bats. As the bats emerge from the felting compartment 20 they receive a second soaking by intermediate jets 133 and 134 (Figure 6) before they enter felting compartment 21. In felting compartment 21, the bats are further sized until they emerge on delivery conveyor 28, which carries the bats to stacker 29, which in turn projects them onto a table or onto conveyor 30, as desired. The bats are similarly treated in their passage through felting compartments 22 and 23.

As already noted, the felting rolls in felting compartments 20, etc., are rotatable. Lower rolls 99, in addition to rotating, are also rapidly reciprocated, further to expedite sizing of the bats. Additionally, upper rolls 45 at times preferably rotate at a higher rate than the lower rolls, in order to effect an operation which is known as "crozing." By this term is meant the relative movement of one ply of the bat with respect to the other so as to avoid the formation of a sharp and ineradicable crease where the plies join. To effect these various movements of the rolls, driving mechanism 24 (Figure 1) is provided. Such driving mechanism, in addition to being sturdy, reliable and durable under conditions of extremely high humidity and speed of operation, should also operate in such a manner as to preclude destructive vibration and afford instantaneous and certain control of the felting compartment mechanism. Still further, it is important that the lubrication of the driving mechanism be so effective as to preclude the leakage of oily lubricant into the felting compartments, and at the same time to preclude the entrance of moisture and fur fibers into the driving compartment. To these ends, the driving mechanism now to be described is directed.

Drive or Transmission

With reference to Figures 7 and 7A, a motor 140 is suitably secured to a housing 141 for the driving mechanism or transmission. The motor armature is connected to a main drive shaft 142 which is operatively connected to the lower rolls in felting compartments 20 and 23 (Figure 1). A suitable coupling 143 (Figure 7A) connects a drive shaft 144 to drive shaft 142 (Figure 7), drive shaft 144 (Figure 7A) being operatively connected to the lower rolls in felting compartments 21 and 22 (Figure 1). Drive shafts 142 and 144 (Figures 7 and 7A) are suitably journaled in main bearings 145, 146, 147 and 148, which are secured to and extend upwardly from the base of housing 141. Each of shafts 142 and 144 has formed thereon a plurality of throws or eccentrics 149, arranged in pairs, each throw of each pair extending oppositely of one another and the eccentrics on shaft 144 being disposed at 90° with respect to the eccentrics or throws on shaft 142, for a purpose to be described. Throws 149 rotatably mount connecting rods 150, 151, 152 and 153 (Figure 7) and 154, 155, 156 and 157 (Figure 7A) arranged in cooperating pairs. For example, connecting rods 150 and 152 accommodate the lower rolls of felting compartment 20. As each cooperating pair of connecting rods is substantially the same as each other pair, only rods 150 and 152 will be considered.

Referring to Figure 7, connecting rods 150 and 152 are rockably connected to a cross head 158 by suitable wrist pins 159. Cross head 158 is slidably mounted between suitable vertical guides 160 and 161, and on support plates 162 (see Figure 7A) having suitable oil grooves 163 cut therein. Cross head 158 also rotatably carries a roller 164 which rides against vertical support 161 for a purpose to be described.

Similarly, connecting rods 151 and 153 are rockably secured to a cross head 165 substantially similar to cross head 158, but oppositely disposed with respect thereto, i. e., cross head 165 has a roll 166 bearing against vertical guide 167, which is oppositely disposed with respect to cross head guide roll 164 and guide 161. As may be seen in Figure 7, connecting rod 151 lies between rods 150 and 152, and rod 153 lies to the right of rod 152. By connecting the rods in this relationship to shaft 142, the bending couple created by rods 150 and 151 exactly counterbalances the bending couple created by rods 152 and 153, thus causing less shaft deflection than would result were rod 153 also disposed between rods 150 and 152. In the latter case the bending moment on that portion of the crank shaft between the main bearings would be the sum of, instead of the difference between, these bending moments. Furthermore this arrangement of the connecting rods adds rigidity to the drive shafts and reduces to a negligible amount whipping and other vibratory movements thereof, thus further lending to the balance and quiet operation of the machine and substantially reducing bearing wear owing to maintenance of uniform oil clearance space.

Rolls 164 and 166 are provided to take the reactive forces due to the driving effect of the multiplicity of gears 209, the thrust of which is transmitted through shafts 170, ball bearings 169 and crosshead 158. These thrusts are in the same direction and cumulative.

As is more clearly shown in Figure 11, crosshead 158 also has an upper guide 168 (see also Figure 7A). Referring back to Figure 11, cross head 158 is preferably substantially U-shaped in vertical cross section, and in its closed side 158a carries a number of ball bearings 169 each of which rotatably supports the end of a shaft 170. A nut 171 is threaded and held on the end of shaft 170 by a suitable lock washer to prevent withdrawal of the shaft from bearing 169 to the left. A locking ring 172 holds bearing 169 in place in cross head end 158a.

Shaft 170 also has secured thereto and rotatable therewith an externally splined bushing 173, which slidably carries a splined spur gear 174. Shaft 170 extends through a bore or channel 175 formed in housing 141, this bore having disposed therein a plurality of sealing discs 176 which surround shaft 170 and prevent escape of lubricant from the housing. The end 170a of shaft 170 which projects outside of housing 141 has a coupling 177 which connects shaft 170 to roll shaft 100 (see Figure 4). It may now be seen that upon rotation of drive shaft 142 (Figure 11), throw 149 rotates to effect reciprocation of cross head 158 by connecting rod 150. As cross head 158 reciprocates, shaft 170 follows, the shaft being rotatable at the same time by virtue of the splined connection between bushing 173, on shaft 170, and spur gear 174, which is part of the roll rotation drive mechanism to be hereinafter explained. Reciprocation of shaft 170 accordingly imparts reciprocation to roll shaft 100 (Figure 4) to reciprocate lower roll 99. While the driving connection of only one of lower rolls 99 has been described, it will be understood that all are similarly reciprocated, cross head 158 driving all of the lower rolls in felting compartment 20, and cross head 165 reciprocating all of the lower rolls in compartment 23.

As adjacent throws 149 (Figure 7) on shaft 142 are 180° apart, the mechanism is perfectly balanced, so that the lower rolls and opposite compartments accelerate and decelerate together and arrive at their path of movement extremities at the same time. Thus the resultant forces set up in one side of the machine, and extending in one direction, are substantially counter-balanced by resultant forces of equal magnitude in the opposite direction, the forces thus neutralizing one another and mutually reducing vibration to a negligible minimum. Preferably approximately 1750 reciprocations per minute are effected, the reciprocal stroke preferably not exceeding one quarter of an inch, a stroke of one-eighth of an inch giving excellent results.

The mechanism for rotating rolls 45 and 99 will now be considered. As the roll rotation imparting mechanism is the same for all of the felting compartments, only the mechanism for compartments 20 and 21 will be described. With reference to Figure 7, drive shaft 142 has a drive gear 178 mounted thereon, and this gear (see Figure 10) meshes with and drives a train of reduction gears 179, 180, 181, 182 and 183. Gear 183 is mounted on and drives a shaft 184, which is journaled in suitable bearings 185 (Figure 7) disposed in supports 186 extending upwardly from the base of housing 141. Shaft 184 carries a pair of change gears generally indicated at 187 and 188 which include gears 210, 211, 214 and 213, which are adapted to selectively mesh with and accordingly drive complementary change gears 199, 200, 201 and 202 (see Figure 7A) which are mounted on the splined end 203 of a shaft 204. Shaft 204 extends substantially longitudinally of the felting compartments and has mounted thereon at spaced intervals therealong a plurality of bevel gears 205, which equal in number and spacing upper rolls 45. With reference to Figure 11, each of bevels 205 meshes with a bevel 189 secured to the end of a shaft 190 rotatably mounted in a suitable journal 191. The other end of shaft 190 extends through suitable sealing discs 192 and through a sealing cap 193 to a point outside of housing 141. This outer end of shaft 190 has mounted thereon one section 194 of a coupling, the other section 195 of which is secured to a shaft 196. A suitable leather or rubber coupling filler 197 is disposed between coupling sections 194 and 195. With reference to Figure 4, shaft 196 is connected to upper roll shaft 48 by a coupling 198 substantially similar to coupling 194—195. These couplings provide universal joints which permit the various movements of frame 44 and the mechanism carried thereby, and the individual movements of shafts 48 as bats pass under the rolls 45, as described above.

It may now be seen that rotation of drive shaft 142 (Figure 7) results in rotation of shaft 184 through reduction gears 178—183. As noted above, gears 210, 211, 214 and 213 (Figure 7) mesh selectively with change gears 199, 200, 201 or 202 (Figure 7A) and accordingly shaft 204 and bevels 205 are rotated. Rotation of bevels 205 results in rotation of bevels 189 (Figure 11) and accordingly shafts 190, 196 and 48 (Figure 4) are rotated to rotate upper rolls 45.

With reference to Figures 7, gear 183 is also connected to a shaft 206, which is substantially coextensive with adjacent felting compartments 20 and 21 (Figure 1) and has secured thereto at spaced intervals therealong a plurality of bevel gears 207, one of these gears being provided for each of lower rolls 99 (Figure 5). Each of bevel gears 207 (Figure 7) meshes with one of a plurality of bevel gears 208 formed on spur gears 209, there being one spur gear 209 provided for each lower roll 99. With reference to Figure 11, spur gear 209 meshes with spur gear 174, which, as before described, has a splined connection with bushing 173 which is secured to shaft 170. Accordingly, rotation of drive shaft 142 (Figure 7) imparts rotation of shaft 206 through gears 178—183. As shaft 206 rotates, meshing bevels 207 and 208 rotate, and accordingly, drive shaft 170, through meshing spurs 209 and 174. As shaft 170 is connected to lower roll shaft 100 (Figure 4) by collar 177, rotation is imparted to lower rolls 99. Preferably the speed of motor 140 (Figure 7) and the arrangement of gears 178—183 is such that a rotation on the order of 340 revolutions per minute is imparted to lower rolls 99. As noted above, the rotating lower rolls also reciprocate at about 1750 reciprocations per minute, and accordingly a ratio on the order of 5 reciprocations to 1 rotation results. We have found that this ratio is particularly efficacious and results in a markedly increased production of uniform, high quality bats.

It should be noted at this point that while the gears in the train driven by gear 178 (Figure 7) on shaft 142 are similar to those comprising the train driven by shaft 144, the latter train includes an idler or reversing gear 300 (Figure 10) which reverses the direction of rotation of the rolls in felting compartments 22 and 23, in order to propel the bats through those compartments in a direction opposite to their direction of travel in compartments 20 and 21. Thus, as shown in Figure 10, the first train comprises gears 179, 180, 181, 182 and 183, while the latter train comprises gears 179a, 180a, idler 300, gears 181a, 182a and 183a.

Shaft 184 (Figure 7) also carries a gear 221 meshing with a gear 222 mounted on a shaft 223 suitably journaled in housing 141. Shaft 223 (bottom of Figure 7A) carries a plurality of spaced bevels 224, which mesh with bevels 225 mounted on the ends of shafts 226, which extend through sealing caps 227 and sealing discs 228 into housing 141. Shafts 226 (Figure 4) are suitably coupled to a conveyor disc shafts 114 by a plurality of suitable couplings 230. Thus rotation of shaft 184, as before described, imparts rotation to shaft 223, which in turn rotates shafts 114 through bevels 224 and 225 to rotate conveyor discs 113 (Figure 5).

Shaft 206 (Figure 7A) carries spur gears 231 and 232, which mesh respectively with gears 233 and 234 mounted respectively on counter shafts 235 and 236 suitably journaled in housing 141. Shaft 235 carries bevels 237, which mesh with bevels 238 mounted on the ends of shafts 239, which extend into housing 141 through suitable sealing caps and discs similar to caps 227 and discs 228. Shafts 239 are suitably coupled to intermediate conveyor disc shafts 114 (shown at the left of Figure 5A). Shaft 236 (Figure 7A) has a similar driving connection with shafts 240, which are coupled to conveyor disc shafts 114 of conveyor 28 (Figure 5A). It will now appear that rotation of shaft 206 (Figures 7 and 7A) imparts rotation to shafts 239 and 240 to rotate conveyor discs 113 (Figure 5A).

As described above, it is important at times to croze the bats as they are passing through the felting compartments, and to effect this crozing one ply of the bat must be moved relative to the other to eradicate the old crease between the plies and form a new one. As hereinbefore noted, upper and lower rolls 45 and 99 (Figure 12) have a coating of rubber. It has been determined that the coefficient of friction between the rubber surface of the rolls and the surface of the bats is on the order of 1.0. Accordingly, if one set of rolls rotates faster than the other, the bat ply engaged by the faster rotating rolls will be moved relative to the bat ply engaged by the slower moving rolls. Furthermore, as the entire bat is firmly engaged by upper and lower rolls at a plurality of regular spaced points throughout the length of the bat, all portions of one ply of the bat move relative to all portions of the other ply of the bat, i. e., one ply skids over the other, and in so doing rolls over the creases between the plies, eradicating the old creases and forming new ones. The amount of this relative movement is a function of the speed differential between the rolls, and accordingly the amount of croze varies directly as the speed differential which can be controlled and accordingly varied. To this end upper rolls 45 (Figure 5A) are rotated at a higher speed than lower rolls 99. This speed differential is attained through change gears 210, 211, 212 and 213 (Figure 7) selectively meshing with change gears 199—202. Change gears 199, 200, 201 and 202 (Figure 7A) are differently toothed, and respectively are adapted to mesh with differently toothed change gears 210, 211, 212 and 213. Gears 199 and 200 are unitary and connected to a grooved collar 214, gears 201 and 202 also being unitary and provided with a grooved collar 215. These change gears are shifted by a shift rod 216 slidably supported in housing 141 and carrying a pair of shift arms 217 and 218 (see also Figure 8) which coact respectively with collars 215 (Figure 7A) and 214. Shift rod 216 (Figure 8) extends outwardly of housing 141 and carries on its end a shift lever 219 which extends upwardly through a guide box 220 (Figure 7) provided with four lever position slots A, B, C and D, and a central neutral position. When shift lever 219 is pulled into position A, shift arm 218 (Figure 7A) engages collar 214 and pulls gear 199 into mesh with gear 210, leaving the other change gears unmeshed. Shifting of lever 219 into position B disengages gears 199 and 210 and meshes gear 200 with gear 211. Shifting of lever 219 into position C (Figure 7) disengages shifting arm 218 from collar 214 and engages shift arm 217 with collar 215 and moves gear 201 into mesh with gear 212. Similar movement of shift lever 219 into position D meshes gear 202 with gear 213. Detents in the cluster gears 199, 200, etc., prevent their accidental displacement when arms 217 and 218 are out of their respective grooves.

As hereinbefore noted, it is only at certain times that crozing is desired, because at certain times the bats are in such a position in the felting compartments that crozing would be detrimental to the bat. This condition pertains, for example, when the bat tip is the leading part of the bat, it being undesirable to effect relative movement of the bat plies when the bat is in this position because of the danger of damaging the tip. Accordingly, when the bat is passing through the machine in this position, shift lever 219 (Figure 7 or 7A) is placed in position D wherein gears 202 and 213 are in mesh. As these gears are equally toothed, no speed differential between the upper and lower rolls results, and accordingly the bats are not crozed. If crozing is desired, however, as for example when the bat is passing through the machine in such a manner that its axis is substantially parallel to the axis of the rolls, gear lever 219 (Figure 1) may be moved into one of positions A, B, or C to mesh corresponding change gears as described, which results in different speeds of rotation of the upper rolls. Thus three different roll speed differentials are available, and the upper rolls may be rotated at a speed equal to that of the lower rolls, or at speeds in excess of that of the lower rolls up to a predetermined maximum depending upon the amount of croze desired, the amount of croze desired usually being dependent upon the nature and condition of the bat.

With reference to Figure 10, lubrication of the transmission hereinbefore described is effected by a gear pump generally indicated at 241, driven by idler gear 300. The gear pump forces oil through a pipe 242 (Figure 7A) into an oil purifier 243 from which the oil flows through a pipe 244 to a header 245, having connected thereto distributor pipes 246, 247 and 248 (see also Figure 7). Pipes 246 and 248 lubricate the various bevels 205, 189, 224, 225, 237, 238 and 207, 209 by which the upper and lower rolls and conveyor discs are rotated. Pipe 247 lubricates main bearings 146 (Figure 7), 148 (Figure 7A), connecting rod bearings at throws 149 (Figures 7 and 7A), guide plates 160 (Figure 7) and 161 and 162 (Figure 7A). Pipe 247 also lubricates gear trains 178-183 (Figures 7 and 7A) and the various bearings which support shafts 184, 206, 223, 235 and 236. After these various parts are lubricated the lubricant collects in the bottom of housing 141 or in a suitable sump (not shown) from which it is drawn by gear pump 241 (Figure 7A) and recirculated. Housing 141 is practically oil tight, as the shafts leading therefrom which rotate the rolls and conveyor discs pass through the oil seals hereinbefore described, which effectively prevent the escape of lubricant or the entrance of moisture.

As hereinbefore noted, connecting rods 150-157 (Figures 7 and 7A) are operated at a speed to impart about 1750 reciprocations per minute to the lower rolls in the felting compartments. As described, one side of the machine balances the other so that the forces set up during the reciprocal strokes of the mechanism on one side are absorbed by the oppositely directed forces set up on the other side, thus precluding a dangerous condition which might otherwise arise from vibration. In this same connection, however, it should be noted that when the throws 149 on shaft 144 (Figure 7A) are in the position indicated, namely that of maximum acceleration, the connecting rods 154-157 are in their position of zero accelerating force. This force varies inversely with the distance from mid-position. Furthermore, when throws 149 on shaft 144 are in the position shown in Figure 7, the accelerating force, regardless of its magnitude, produces a zero turning moment on the crank shaft. As the accelerating force decreases, the turning moment increases and the variations of the turning moment from maximum to minimum occur at the rate of two cycles per revolution of the shaft, thus giving rise to a frequency which corresponds with the frequency of the alternating current of the supply source (usually 60 cycles). The coincidence of what might be termed the mechanical frequency with the electrical frequency, i. e., the frequency of the driven system and the frequency of the driving system would result in a serious condition of resonance between the mechanical and electric circuits.

To mitigate this effect, the crank throws 149 on shaft 142 (Figure 7) are set at right angles to the throws on shaft 144 (Figure 7A). It becomes apparent that this arrangement of the crank throws on shafts 142 and 144 (Figures 7 and 7A) brings the maximums and minimums of turning moment much closer together and doubles the frequency of variation thus taking the mechanical system or circuit out of synchronization with the electric system or circuit and accordingly eliminating resonance.

As described above, each adjacent pair of felting compartments, for example, compartments 20 and 21 (Figures 5 and 5A) include a water pipe and spray system by which the bats are soaked before and during their travel through the felting compartments. With reference to Figure 4, a catch screen 249 is formed below the felting compartments by side walls 250 and 251, and perforated bottom 252, which strains the water from sprays 130, 132 and 137 into the tanks. Any suitable heating medium underneath may be employed for the tanks under screen 249 for reheating. At times, however, it is desirable that the tank be voided of water quite rapidly, and for this purpose there is provided one or more release valves 253 (Figure 5) which may be opened by depression of a lever 254 pivoted at 255.

As noted above, each pair of felting compartments has a cooperating stacker, for example, stacker 29 (Figure 3) which cooperates with felting compartments 20 and 21. While the various details of construction and operation of the stacker are fully described in the above-noted application of Robert Pash, it might be well to note that stacker 29 comprises a pair of corrugated rolls 256 and 257, a retarding roll 258 and a drag bar 259. Roll 256 is vertically movable and is constantly urged downwardly both by its own weight and by the pressure of a spring 260. Reduction gears 42 are driven by motor 40 through a shaft 261, the gearing being such that upper stacker roll 256 rotates at a lower speed than lower stacker roll 257, the gearing also being such that retarding roll 258 is driven at the same speed as the lower roll.

In operation, stacker rolls 256 and 257 grasp the leading portion of the moving bat and draw the bat from conveyor 28. As the bat passes between these rolls, it is corrugated along lines normal to the axes of the rolls, and because of the higher speed of rotation of lower roll 257, the bat is curved upwardly slightly as it leaves the rollers. Because of the corrugations imparted to the bat it is relatively rigid and may thus be projected through the air without crumpling. Retarding roll 258 and drag 259 engage portions of the bat after it leaves the corrugated rolls, and this action affects the movement of the bat in such a manner that it falls in a predetermined and desired manner on a table (not shown) or conveyor 30, if desired. Where a table is utilized, each successive bat flies through the same path and acccordingly the successive bats are neatly piled on one another. It is possible that because of the speed differential between stacker rolls 256 and 257 a croze is imparted to the bat. Where the bat is traveling edgewise, i. e., when its axis is parallel to the axis of the stacker rolls, any croze which might be imparted to the bat by these rolls is beneficial. The amount of croze, however, is not sufficient to damage the bat when it is traveling tip first.

Returning now to the felting compartments, and particularly to Figure 4, it should be noted that by reason of the individual journaling of the opposite ends of upper rolls 45, either end of these rolls can be raised independently of the other. This results in more uniform work on the bats because the tips and brims thereof are of different thicknesses. Accordingly the pressure of the roll is evenly distributed over the total area of the bat. Also, by reason of the fact that roll slots 135 and 136 are laterally spaced, there is no longitudinal zone in the bat which remains untreated as would otherwise be the case were these slots or grooves in the same plane in both the upper and lower rolls.

To summarize the operation of the machine, the operator tosses bat 25 onto disc conveyor 27, which carries the bat to felting compartment 20. Immediately before the bat enters this compartment it is thoroughly soaked by water sprays 132 and 130 (Figure 4). Thence the bat passes into the felting compartment between rolls 45 and 99. Assuming that bat 25 is traveling in a position, e. g. edge first, as distinguished from tip first, and crozing is desired, rolls 45 and 99 carry the bat along an undulating path in a series of waves, the length of each of which is commensurate with the diameter of the rolls. During this undulating movement of the bat, lower rolls 99 are reciprocating or jigging rapidly in addition to rotating, and upper rolls 45 are rotating at a higher speed than lower rolls 99. The combination of the abrupt undulations, the rapid jigging, and the speed differential rapidly sizes and crozes the bats as they pass through felting compartment 20. At the same time, streams of fluid under pressure coming from jets 137 and 138 moisten the bat. However, the fluid from sprays 137 and 138 insufficiently moistens the bat, which becomes comparatively dry from the pressure exerted thereon from the rolls while passing through compartment 20. Accordingly, while passing from compartment 20 to compartment 21 (Figure 6) intermediate sprays 133 and 134 thoroughly soak the bat before it enters compartment 21. Compartment 21 subjects the bat to treatment similar to that in compartment 20.

From compartment 21 (Figure 1) the bat is delivered to disc conveyor 28, which carries it to stacker 29. This stacker projects the bat through the air either onto a table (not shown) where the bat falls in superimposed relationship on previously stacked bats, or onto conveyor 30 which carries the bat to table 31. Here another operator takes the bat from conveyor 30 and tosses it on disc conveyor 32, preferably changing the position of the bat from the position in which it lay while passing through compartments 20 and 21. If the bat is tossed on disc conveyor 32 tip first, the upper roll drive for compartments 22 and 23 is regulated by manipulation of shaft lever 219 into position D to bring the speed of rotation of the upper and lower rolls in the felting compartment into coincidence, thus to avoid crozing. Accordingly the bats are soaked before passing into compartment 22, wherein they are kneaded and rubbed, as before described, again soaked before passing into compartment 23, again kneaded and rubbed, and delivered onto disc conveyor 33 which carries the bats to stacker 34. Stacker 34 projects the bats either on a table (not shown) or on belt conveyor 35, which carries the bats back to the operator at entry end 26. The bats, of course, may be passed through the machine as many times as is necessary to bring them down to size.

Because of the high speed at which the machine operates (1750 reciprocations of the lower rolls per minute, and 350 revolutions per minute of the rolls) a bat may be shrunk to size in a very substantially lessened time, in certain instances in a quarter of the time which would be necessary in a conventional multi-roller machine. Furthermore, the total time of contact between the bat and the rolls is greatly reduced, and this not only vastly improves the quality of the bat, but substantially eliminates the bleeding of color from them and reduces to a minimum the washing out of short stock. Furthermore, because of the croze control whereby the bats are not crozed when passing through the machine tip first, wrinkling of the tip is prevented and accordingly not only the shape of the bat is maintained throughout the felting operation, but also damage is precluded.

By virtue of the mechanism controlled by shift lever 219 (Figure 1) whereby roll speed is quickly adjusted; because of the roll pressure control afforded by lever 77 (Figure 6), and through the roll spacing control effected by operation of pointer 110 (Figure 4) the machine is readily adapted to operate on all types, weights and qualities of bats.

It accordingly appears that there has been provided a machine and method for sizing hat bats in an efficient and practical manner having among others the advantages referred to hereinabove.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

We claim:

1. A machine of the character described comprising, in combination, a plurality of coplanar felting compartments having rolls for felting and shrinking hat bats, and common driving means connected to said rolls and disposed between adjacent compartments.

2. A machine of the character described comprising, in combination, oppositely disposed balanced felting compartments having mechanism for felting and shrinking hat bats, said mechanism including a plurality of rolls, and means disposed between said compartments and operatively connected to said rolls for simultaneously rotating and reciprocating some of said rolls.

3. A felting compartment for a machine of the character described having a plurality of felting rolls arranged in upper and lower banks, and means hingedly supporting the upper bank of rolls with relation to the lower bank, the axis of said hinge means being transverse to the axes of said rolls.

4. A machine of the character described comprising, in combination, a plurality of felting members, driving means for said felting members, a lubricating system for said driving means, and means for segregating said driving means from said felting members to prevent the entry of lubricant into the felting members and to prevent the entry of water into the driving means.

5. A machine of the character described comprising, in combination, a plurality of separate sections of felting rolls, means for rotating said rolls, conveyer means located between adjacent sections, said conveyer means comprising a plurality of rotating circular discs which are spaced from one another, and means for directing a spray of water through said discs against a bat carried thereby.

6. A machine of the character described comprising, in combination, a pair of felting compartments each having mechanisms operable to felt and shrink a bat passing therethrough, a drive shaft positioned between said compartments and having its axis substantially normal to the operative axes of said mechanisms, and means forming a driving connection between said drive shaft and said mechanisms.

7. A machine of the character described comprising, in combination, a pair of felting compartments each having mechanisms operable to felt and shrink a bat passing therethrough, a drive shaft positioned between said compartments and having its axis substantially normal to the operative axes of said mechanisms, means forming a driving connection between said drive shaft and said mechanisms to rotate said mechanisms, and means forming another driving connection between said shaft and said mechanisms to reciprocate said mechanisms.

8. A machine of the character described comprising, in combination, a plurality of felting rolls arranged in upper and lower banks, means hingedly relating one of said banks to the other, a drive shaft, and means forming a driving connection between said drive shaft and said rolls.

9. A machine of the character described comprising, in combination, a felting compartment having mechanisms for felting and shrinking a bat, means for spraying water on the bat during the operation of said mechanisms, and driving means for said mechanisms segregated therefrom and operatively connected thereto, said driving means including a force feed lubrication system, said driving means and lubrication system being disposed in a compartment spaced from said felting compartment whereby lubricant is sealed from the felting compartment and water is sealed from the driving compartment.

10. A machine of the character described comprising, in combination, a felting compartment including a plurality of rotatable rolls arranged in staggered relationship in upper and lower banks, a second felting compartment coplanar with the first and including a plurality of rolls arranged similarly to those in said first compartment, and roll rotating mechanism disposed between and common to both of said compartments and operatively connected to all of said rolls to effect operation thereof.

11. A machine of the character described comprising, in combination, a pair of felting compartments each including a plurality of rotatable rolls whose axes are parallel and which are arranged in staggered relationship in upper and lower banks, said compartments being juxtaposed in the same general horizontal plane, and common driving mechanism positioned between said compartments and operatively connected to said rolls to effect rotation thereof.

12. A felting compartment for a machine of the character described having a plurality of felting members arranged in separable upper and lower banks, and hinge means supporting the upper bank of members with relation to the lower bank, the axis of said hinge means being normal to the axis of said felting members.

13. A felting compartment for a machine of the character described having a plurality of felting members arranged in separable upper and lower banks, hinge means supporting the upper bank of members with relation to the lower bank, the axis of said hinge means being normal to the axis of said felting members, and means for locking said upper and lower banks and felting members against separation.

14. A felting compartment for a machine of the character described having a plurality of felting members arranged in separable upper and lower banks, hinge means supporting the upper bank of members with relation to the lower bank, the axis of said hinge means being normal to the axis of said felting members, and pressure means for each felting member in the upper bank for urging said members toward those in the lower bank.

15. A felting compartment for a machine of the character described having an entry and a delivery end, conveyor means located adjacent each of said ends for carrying bats into and out of the felting compartment, each of said conveyors comprising a plurality of spaced rotatable members, and means disposed beneath said members for shooting a spray of water upwardly thereof against bats being conveyed into the entry end of the felting compartment.

16. A felting compartment for a machine of the character described having a plurality of rotatable rolls arranged in staggered relationship in upper and lower banks, driving mechanism for rotating said rolls, means operatively connecting said lower rolls to said driving mechanism, means universally connecting said upper rolls to said driving mechanism, and means hingedly supporting said upper rolls with relation to said lower rolls.

17. A felting compartment for a machine of the character described comprising upper and lower frame members, felting rolls operatively mounted in each of said frame members, means connected to said rolls to effect operation thereof and means hingedly connecting said frame members whereby one may be moved relative to the other to separate the felting members in one frame from those of the other.

18. A machine of the character described comprising, in combination, a pair of felting compartments each including a plurality of rotatable rolls, driving means located between said felting compartments and including a crank shaft, a pair of cross heads connected to the throws of said crank shaft on opposite sides thereof, and means securing at least some of the rolls of each of said compartments to their respective cross heads.

19. Driving mechanism for a felting machine wherein a plurality of rotatable rolls are arranged to operate on a hat bat comprising, in combination, a crank shaft, a cross head connected to a throw on said crank shaft for reciprocation thereby, a drive shaft parallel to said crank shaft and operatively connected thereto for rotation thereby, and gear means associated with said drive shaft and said cross head for connecting said drive shaft and some of said rolls for operation of said rolls, whereby upon operation of said crank shaft said last-mentioned rolls are both rotated and reciprocated.

20. Driving mechanism for a felting machine wherein a plurality of rotatable rolls are arranged to operate on a hat bat comprising, in combination, a crank shaft, a drive shaft parallel to said crank shaft and geared thereto for rotation thereby, the axes of said shafts being normal to the axes of said rolls, means forming a geared connection between said drive shaft and said rolls, said geared connection including change gears for varying the speed of rotation of some of said rolls with respect to the others.

21. In a machine of the character described, in combination, a plurality of rolls for felting and shrinking a bat, a driven system including a drive shaft having throws, a plurality of cross heads connected to said throws, means connecting some of said rolls to said cross heads, and a driving system for operating said driven system to reciprocate said cross heads and said last-mentioned rolls, the frequency of the driven system exceeding that of the driving system whereby the two systems are out of synchronization to decrease resonance.

22. A felting compartment for a machine of the character described having a plurality of rolls arranged in upper and lower banks, means forming an enclosure for said rolls, means for directing streams of water against said rolls, and a water lubricated bearing for each of said rolls, said bearings being disposed within said enclosure in a position to be subjected to the water directed against said rolls.

23. A machine of the character described comprising, in combination, oppositely disposed felting compartments having mechanism for felting and shrinking hat bats, said mechanism including a plurality of rolls, and means for imparting axial reciprocation to some of said rolls in each of said compartments, said means disposed between said compartments whereby the reciprocation of the rolls in one compartment is balanced against the reciprocation of the rolls in the other compartment.

24. A machine of the character described comprising, in combination, oppositely disposed balanced felting compartments having mechanism for felting and shrinking hat bats, said mechanism including a plurality of rolls, means disposed between said compartments and operatively connected to said rolls for simultaneously rotating and reciprocating some of said rolls, and means for effecting a speed differential between the rates of rotation of different sets of said rolls so that a hat bat passing therethrough has its plies shifted to croze the bat.

25. A felting compartment for a machine of the character described having a plurality of felting rolls arranged in upper and lower banks with their axes in staggered relationship, said rolls having annular slots formed therein, the slots in the rolls of one bank being offset from the slots in the rolls of the other bank, and means cooperating with said slots to prevent the bats passing between the rolls from riding substantially vertically between said rolls.

26. A felting compartment for a machine of the character described having a plurality of felting rolls arranged in upper and lower banks with their axes in staggered relationship, said rolls having annular slots formed therein, the slots in the rolls of one bank being offset from the slots in the rolls of the other bank, and means for directing jets of fluid under pressure into said slots to prevent the bats passing between the rolls from riding substantially vertically between said rolls.

27. A felting compartment for a machine of the character described having a plurality of felting rolls arranged in a plurality of separate sections, there being space between each of said sections through which a bat must pass when going through the machine, means for rotating said rolls at high speed to force the bats through said machine at high speed, each of said sections comprising an upper and lower bank of rolls, and means for directing a spray of water into said spaces between said sections so that hat bats passing from section to section at high speed are thoroughly soaked with water.

28. A machine of the character described comprising, in combination, a plurality of banks of rolls for felting and shrinking a bat, a crank shaft mounted to rotate about an axis substantially normal to the axes of said rolls and positioned between said banks of rolls, connecting rod means connected to said crank shaft, a crosshead for each of said banks of rolls which crossheads are connected to said connecting rod means, and means rotatably mounting each bank of said rolls in one of said crossheads, whereby operation of said crank shaft effects reciprocation of said rolls.

29. A machine of the character described comprising, in combination, a pair of felting compartments each having mechanisms operable to felt and shrink a bat passing therethrough, a drive shaft positioned between said compartments and having its axis substantially normal to the operative axes of said mechanisms, means forming a driving connection between said drive shaft and said mechanisms, and means actuated by said drive shaft and selectively operable to vary the operative condition of said mechanisms to effect crozing operation thereof, whereby a bat is crozed during the felting and shrinking thereof.

30. A machine of the character described comprising, in combination, a pair of felting compartments each including upper and lower banks of rotatable rolls operable to felt and shrink a hat bat passing therethrough, a drive shaft positioned between said compartments and having its axis substantially normal to the operating axes of said rolls, a pair of crossheads arranged on opposite sides of said drive shaft and operatively connected thereto for reciprocable movement thereby, and means rotatably mounting at least one of the banks of rolls in said compartments to one of said crossheads, whereby said last-mentioned rolls are reciprocated therewith.

31. A machine of the character described comprising, in combination, a pair of felting compartments each including upper and lower banks of rotatable rolls operable to felt and shrink a hat bat passing therethrough, a drive shaft positioned between said compartments and having its axis substantially normal to the operating axes of said rolls, a pair of crossheads arranged on opposite sides of said drive shaft and operatively connected thereto for reciprocable movement thereby, means rotatably mounting at least one of the banks of rolls in said compartments to one of said crossheads, whereby said last-mentioned rolls are reciprocated therewith, and gear means driven by said drive shaft for rotating said rolls.

32. A machine of the character described comprising, in combination, a pair of felting compartments each including a plurality of rotatable rolls whose axes are parallel and which are arranged in staggered relation in upper and lower banks, a pair of shafts associated with each of said felting compartments and including means for rotating said rolls, a drive shaft centrally arranged between said compartments, gear means forming a driving connection between said drive shaft and said first-mentioned shaft, and means connecting some of said rolls to said drive shaft for reciprocation thereby.

33. A machine of the character described comprising, in combination, a pair of felting compartments each including a plurality of rotatable rolls whose axes are parallel and which are arranged in staggered relation in upper and lower banks, a pair of shafts associated with each of said felting compartments and including means for rotating said rolls, a drive shaft centrally arranged between said compartments, gear means forming a driving connection between said drive shaft and said first-mentioned shaft, and means connecting some of said rolls to said drive shaft for reciprocation thereby, said gear means including change gears selectively operable to vary the rate of rotation of some of said rolls with respect to other of said rolls.

FREDERICK FRANZ.
A. H. BOESCH.
ROBERT PASH.